Figure 1:
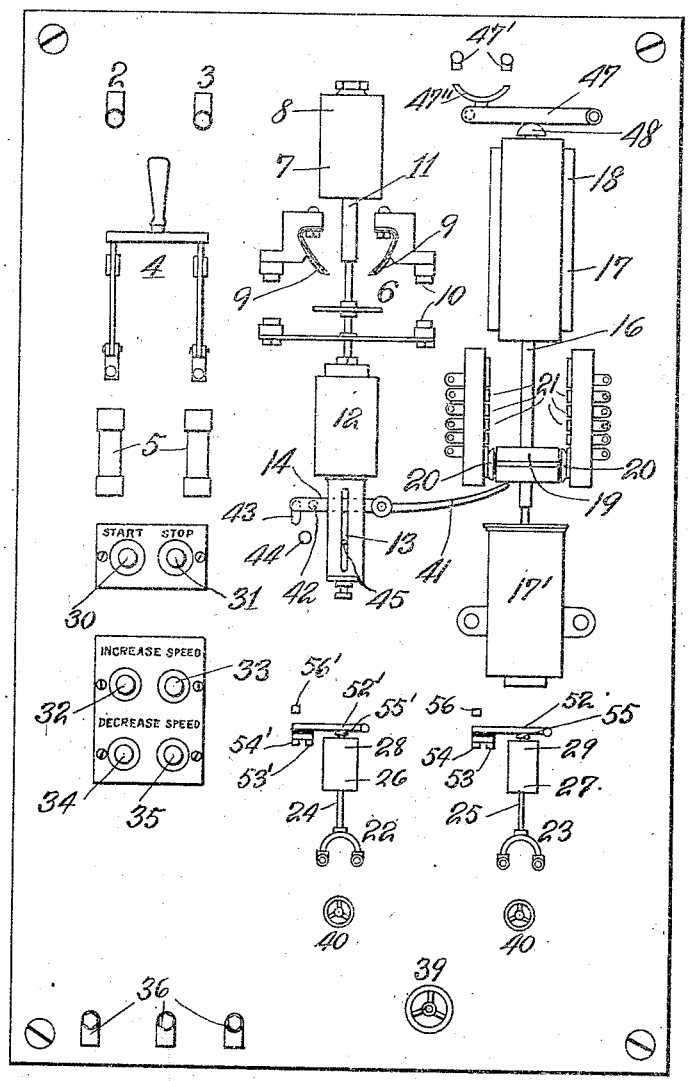

H. W. LEONARD.
MOTOR CONTROLLING MEANS.
APPLICATION FILED JULY 22, 1907.

1,074,961.

Patented Oct. 7, 1913.
5 SHEETS—SHEET 1.

FIG. I

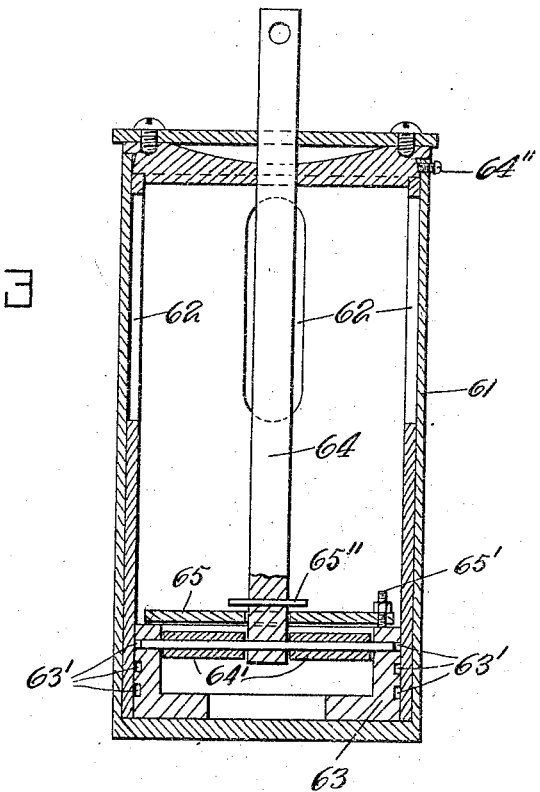

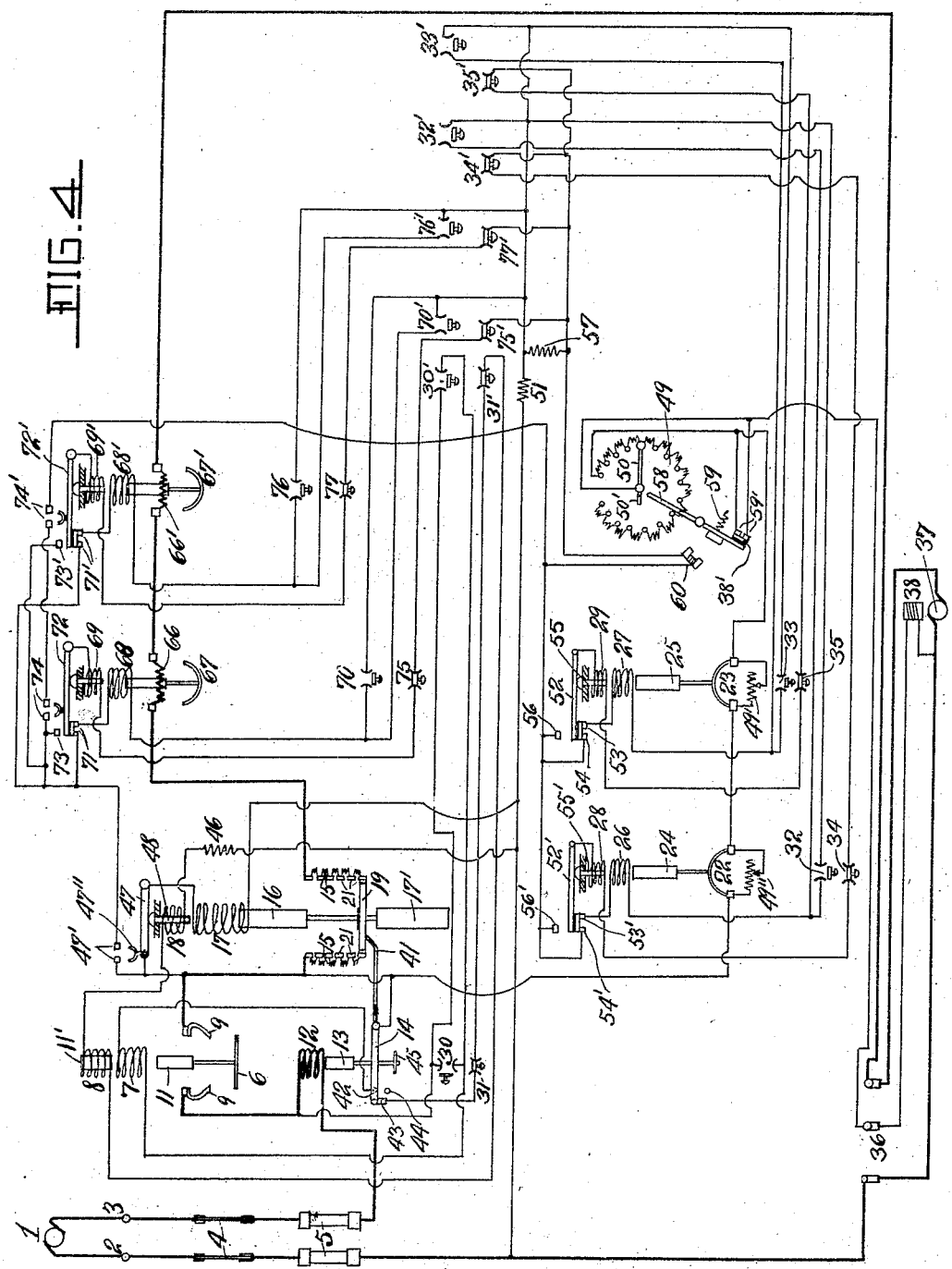

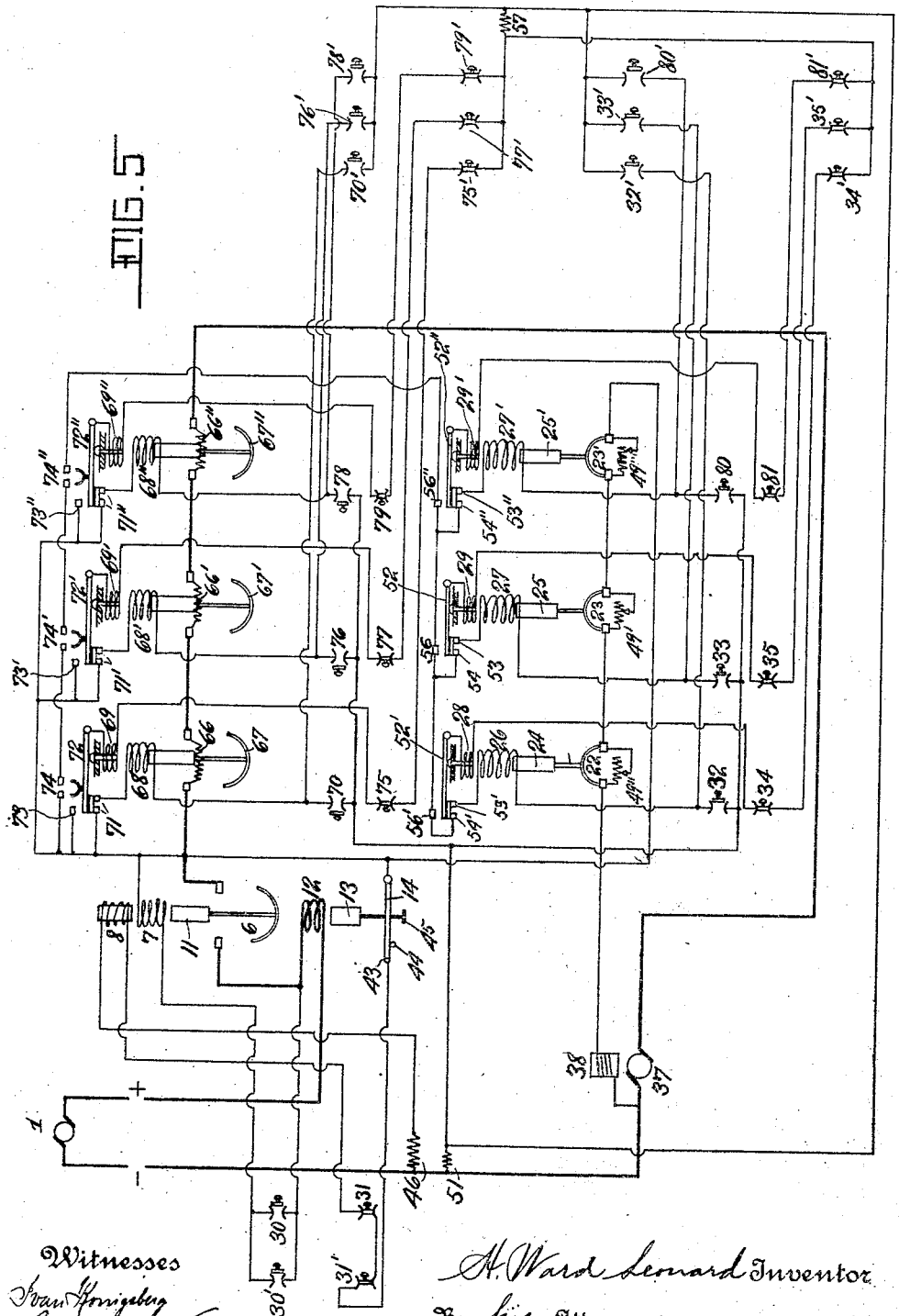

UNITED STATES PATENT OFFICE.

HARRY WARD LEONARD, OF BRONXVILLE, NEW YORK.

MOTOR-CONTROLLING MEANS.

1,074,961.  Specification of Letters Patent.  Patented Oct. 7, 1913.

Application filed July 22, 1907. Serial No. 384,989.

*To all whom it may concern:*

Be it known that I, HARRY WARD LEONARD, a citizen of the United States, residing at Bronxville, in the county of Westchester and State of New York, have invented certain new and useful Improvements in Motor-Controlling Means, of which the following is a full, clear, and exact specification.

My invention relates to the control of electric motors and similar devices, and more particularly to the automatic starting of an electric motor supplied from a constant electromotive force supply circuit and to automatic control of the speed of the motor.

In general, the object of my invention is to provide automatic controlling means of improved form which shall be reliable, efficient and conveniently controlled by the operator.

Among the features and advantages of my invention may be mentioned the control of the motor by means of push buttons which may be located at any convenient point or points and securing in addition to the starting and stopping of the motor by operation of such or similar switches, the control of the speed as desired. When the motor is not running no power is absorbed by the motor or controlling devices. The controlling circuits are arranged to be deënergized after serving their purpose so that when the circuits of the push buttons closed by the operator are afterward opened at the push buttons, there will be no interruption of current.

The stopping of the motor may be accomplished by opening the circuit of one or more other push buttons, and the circuits are so arranged that the current interrupted by the push buttons may be as small as one-tenth of an ampere. The economy in the operation of the automatic switches is secured in my preferred form of construction by providing a lifting magnet and a holding magnet, the lifting magnet being automatically or otherwise deënergized after the switch is closed, and the holding magnet carrying only a very small current. I provide a main switch which is automatically controlled and so interlocked with the resistance controlling element for starting the motor that the switch cannot be automatically closed unless the resistance controlling element is in the all resistance in position. Increase or decrease of speed may also be secured in accordance with my invention by the use of push buttons with controlling devices which are reliable and efficient.

One feature of my invention relates to the time element device for controlling the change of starting resistance, and this is of such form and construction that the same is reliable and works in a uniform manner without reference to change of temperature. I thus overcome what has been the very serious objection to the use of dash pots in connection with resistance controlling devices. I also provide improved forms of protective devices for the motor and controlling means.

Another feature of my invention relates to starting, stopping and speed controlling means which is entirely automatic and useful for example in connection with the operation of motor driven pumps for maintaining a desired water level or a desired pressure.

These and other features of my invention will be understood from the following description and accompanying drawings.

My invention is susceptible of various modifications and forms of construction, and it will be understood that my invention is not limited to the forms particularly shown and described and the scope thereof will be indicated by the appended claims.

Figure 2:
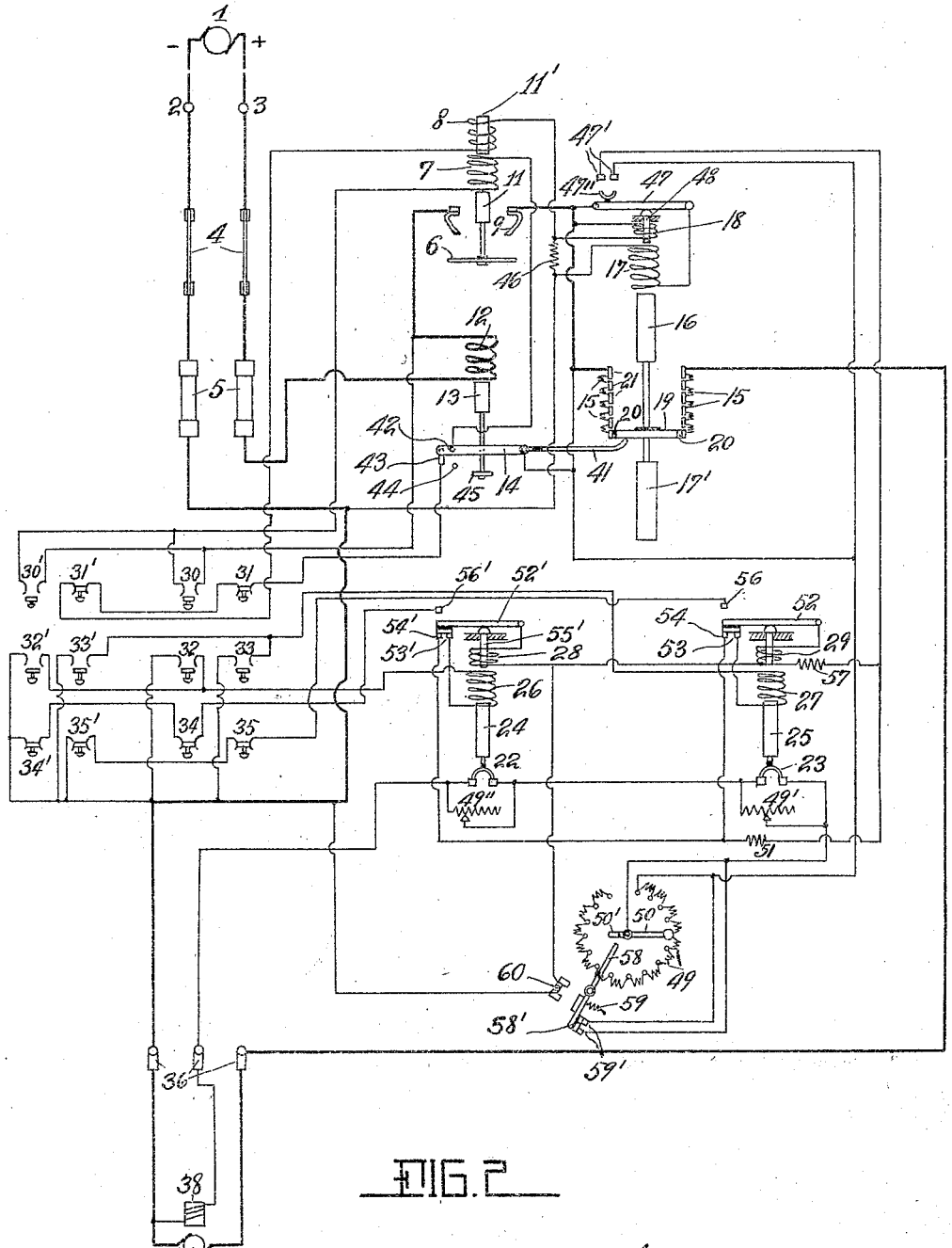

Figure 1 of the accompanying drawings is a front elevation of a controlling panel, embodying certain features of my invention; Fig. 2 is a diagram of connections; Fig. 3 is a sectional view of my improved form of dash-pot; Fig. 4 is a diagram of connections of another form of my invention; Fig. 5 is a diagram of connections of still another form of my invention; and Fig. 6 is a diagram illustrating my invention applied to the control of a pump for obtaining the desired operation automatically.

Referring to Figs. 1 and 2, a score of constant electromotive force is indicated at 1, and connected to the line terminals 2, 3. A main double pole switch is shown at 4, the main circuit then passing to the fuses 5. At 6 is indicated the automatic starting switch controlled by the raising coil 7 and holding coil 8. This switch is provided with yieldable laminated main contacts 9 and auxiliary carbon breaks 10 as shown in Fig. 1. The controlling magnet for this switch, as well as for the other automatic switches, will preferably be of the iron clad type, and this switch is shown as having a plunger or core 11 for controlling the movement of the movable part of the switch. An overload protective device is shown as having the series controlling coil 12 and plunger 13, which controls the movement of a switch arm 14 upon overload. In this form of my invention is shown an armature starting resistance 15 automatically controlled by the movement of a plunger 16, which in turn is controlled by a raising coil 17 and a holding coil 18, the downward movement of this switch being controlled by gravity as in the case of the other automatic switches. The movement of the plunger 16 is also controlled by a novel form of dash-pot 17', the construction of which is shown in detail in another figure and will hereinafter be explained. The plunger 16 is provided with one or more cross pieces 19, at the opposite ends of which are carried yieldable contacts 20 in the form of skate shoes which are double acting and spring pressed outwardly at opposite ends. These shoes or contacts 20 engage the series of forwardly extending contacts 21 between which the sections of armature resistance 15 are connected. Switches for controlling the speed of the motor are indicated at 22, 23, the movements of which are controlled by plungers 24, 25 which in turn are controlled by raising coils 26, 27 and holding coils 28, 29. A push button switch is shown at 30 for controlling the starting of the motor, and another push button switch is shown at 31 for controlling the stopping of the motor. At 32 and 33 are push button switches for controlling the speed of the motor after the starting resistance is cut out and the operation of these switches secure increase in speed. Corresponding push buttons 34, 35 control decrease in speed of the motor. Terminal connections for the motor are shown at 36, the motor in Fig. 2 being indicated of the shunt field direct current type having the armature 37 and field winding 38. Means for manually adjusting the field strength of the motor is indicated at 39 in Fig. 1, and manual means for adjusting the amount of resistance controlled by the automatic switches 22, 23 is indicated at 40.

In order to prevent starting of the motor except when all the armature resistance 15 is in circuit, I so relate the circuit of the raising coil 7 of the starting switch to the resistance controlling element that the circuit of the raising coil can be rendered effective only when the resistance controlling element 19 is in the all resistance in position or at least in a proper protective position. The switch arm 14 is provided with an extension 41 which projects into the path of the element 19. By this arrangement when the element 19 is in its lowest position and all resistance is inserted, the switch arm 14 will be raised so as to engage contact 42 as shown, which contact is connected to one terminal of raising coil 7. The switch arm 14 also engages the contact 43 in the position shown in the drawings, and this contact is connected through a push-button switch 31 to one terminal of the holding coil 8. When the resistance controlling element 19 is raised, the switch arm 14 will fall by gravity, or in some cases by force from other means as by a suitable spring, breaking engagement with contact 42 and coming against the stop 44, the connection with contact 43 however being maintained. Thus it will be seen that the raising coil 7 can be operatively energized only when the movable element 19 of the armature rheostat is in a proper protective position. The cross piece 45 connected to the plunger 13 of the overload coil 12 is adapted to engage the switch arm 14 in its upward movement, and in so moving will raise switch arm 14 from the position shown in the drawings, breaking connection with contact 43 and so breaking the circuit of the holding coil 8. Consequently, upon the occurrence of an overload current in the motor circuit, the holding coil 8 will be de-energized and the main switch 6 will fall by gravity so breaking the main circuit and causing the armature resistance to be automatically inserted and also automatically placing the circuit of the raising coil in condition to be closed by the operator at push button 30.

Referring now more particularly to the various connections and mode of operation, suppose the switch 30 is closed manually. Current will then pass from one terminal of the source 1 through one side of switch 4 from terminal 3, then through one of the fuses 5, and through the overload coil 12, but cannot pass through the main switch 6 as that is open. From overload coil 12, current will pass through switch 30, through the raising coil 7 of the main switch 6, then to contact 42, arm 14, to one of the resistance contacts 21, then through part of the armature starting resistance 15, element 19 and the remaining part of the resistance 15 to one of the terminals 36 through the motor armature 37 which is stationary, and thence to the other side of the supply circuit, through fuse 5, switch 4 and terminal 2. It may be stated incidentally that slight current will also pass through raising coil 17 in parallel with the motor armature and starting resistance, but this current will be so slight as to have no effect upon the movement of the resistance controlling element 19. The current through raising coil 7, however, is sufficient to raise its plunger 11 and close the main switch 6. This closes the main circuit for starting the motor, current passing from one side of the line through overload coil 12, main switch 6, starting resistances 15 and then through the motor armature to the other side of the line. The closing of main switch 6 short circuits and therefore deënergizes the raising coil 7. When plunger 11 is raised by coil 7, it is given sufficient momentum to make contact with the iron core 11' of holding coil 8 which is energized with sufficient current to hold the plunger 11 and switch 6 in its upper position, at the same time as the raising coil is energized, the circuit of holding coil 8 being from one side of the line through overload coil 12, coil 7 to contact 42, arm 14 to contact 43, push button switch 31, through the holding coil 8 and through the comparatively high resistance 46 to the other side of the line. The closing of main switch 6 now causes sufficient current to flow through the raising coil 17 to act upon plunger 16, the circuit being from the overload coil 12 and switch 6 through a pivoted switch arm 47, then through the coil 17 to the other side of the line. The plunger 16 is then raised against gravity and the retarding force of the dash pot 17', gradually cutting out the starting resistance 15 and increasing the speed of the motor. The construction of the dash pot 17' is such that when near the end of its upward travel, the plunger will suddenly accelerate and strike the pin 48, deliver a blow to the same and quickly open the switch 47 and cause the contacts 47', 47' to be bridged by the laminated switch 47" which is insulated from arm 47. The function of the switch 47" will be hereinafter explained. This quick action minimizes the spark occurring at the contacts, and the opening of switch 47 will deënergize coil 17 which will therefore consume no further energy. Of course instead of opening the circuit an equivalent effect could be secured by inserting a high resistance which in some cases might be desirable. The plunger 16 is held in its upper position by the holding coil 18 which is energized when switch 30 is closed, the circuit being from line 3 to overload coil 12, switch 30, coil 7, contact 42, arm 14, through coil 18 and resistance 46 to the other side of the line. The resistance 46 is so high that only a very small current passes through holding coils 8 and 18, and the energy used by these coils during the operation of the motor is therefore very slight. When the resistance controlling element 19 is raised from its lowest position, the extension 41 is released and switch arm 14 allowed to move against the stop 44, disconnecting contact 42; consequently, as above stated, the circuit of coil 7 cannot again be closed until the armature resistance 15 has been placed in circuit by the falling of plunger 16. Thus if from any cause the main switch 6 is opened, the operator cannot start the motor by closing the switch 30 until the motor armature circuit has been protected by the insertion of a protective amount of the starting resistance.

If no-voltage occurs on the line, or if the voltage becomes abnormally low, the main switch 6 will no longer be held in its upper position by the coil 8, and this main switch will therefore be opened. Similarly, the plunger 16 will be released by the holding coil 18 and the resistance controlling element 19 will fall, the construction of the dash pot being such as to allow a rapid downward movement. The motor and controlling circuits are therefore fully protected upon reëstablishment of the line voltage. Protection from overload or abnormally large current is secured by the action of the overload coil 12 which carries all current supplied to the system, and which upon overload raises the plunger 13 and causes the circuit of the holding coil 8 of the main switch to be interrupted by movement of the switch arm 14 which then breaks the connection with contact 43 as already referred to. Consequently, upon overload, the main switch 6 will be opened for protecting the motor and controlling circuits.

For definitely controlling the speed of the motor in the form shown in Figs. 1 and 2, I provide the automatic field controlling switches 22, 23 already referred to and which are controlled by the push button switches 32, 33, 34 and 35. The field circuit of the motor includes the following elements: Current after passing through the overload coil and main switch 6, passes through the resistance 49 of the manually operated rheostat, the movable element 50 being controlled by the hand wheel 39 shown in Fig. 1; after passing through such portion of the resistance 49 as is in circuit, the field current then passes through the contact arm 50, through switch 23 which shunts the adjustable resistance 49', then through switch 22 which shunts the adjustable resistance 49" and then through the field winding 38 of the motor to the other side of the line. It will be seen that the motor field winding and armature are always connected in a permanently closed local loop since both the field and armature circuits start from the right hand terminal of switch 6, and are connected together at their opposite terminals as shown in the lower left hand portion of Fig. 2; tracing this permanently closed local circuit we may start say with the right hand brush of the armature 37 as follows:—The circuit passes to the right hand terminal 36, then through the armature starting resistance 15, then to the field connection down through rheostat 49, switch 23, switch 22, middle contact terminal 36, field winding 38 and then through the motor armature to the right hand brush again. There is therefore always a closed circuit to receive the field discharge when the main circuit is open.

The motor having been started as above explained, suppose the operator desires to obtain an increase in speed. He will close either one of the push button switches 32 or 33. If switch 33 be closed, it will complete the circuit of the raising coil 27 of switch 23 as follows:—After passing through the overload coil and switch 6, current will pass through contacts 47' and switch 47" to resistance 51, which is adjusted to such an amount as to give sufficient current through the raising coil 27; current then passes through a portion of the switch arm 52 which bridges the contacts 53, 54, then through the raising coil 27 through switch 33 which is closed by the operator and then to the other side of the line. The plunger 25 of coil 27 will therefore be raised, opening the switch 23 and weakening the field strength to give increased speed of the motor by the insertion of the resistance 49' in the field circuit. When the core 25 is near the end of its upward movement, it strikes the pin 55 with a blow which in turn moves the arm 52 from the position shown in the figure into engagement with contact 56, at the same time breaking the connection between contacts 53 and 54. The raising coil 27 will therefore be deënergized whereas the holding coil 29 will be energized and hold the core 25 in its upper position, the circuit of the holding coil 29 being from the overload coil, through switch 6, switch 47" through a resistance 57, coil 29, switch arm 52 to contact 56, and through push button switch 35 to the other side of the line. The resistance 57 is a high resistance and adjusted to such an amount that only the small current necessary for holding core 25 in its upper position is passed through coil 29. If it be desired to decrease the speed to the original amount by short circuiting the resistance 49', the push button 35 is opened by the operator which breaks the circuit of the holding coil 29 and the core 25 drops closing switch 23. At the same time switch arm 52 and pin 55 will drop and bridge the contacts 53, 54 and so place the circuit of raising coil 27 in condition to be closed by the operator at push button 33. With this construction it will be seen that no current is consumed by holding coil 29, except when switch 23 is open and only a comparatively slight amount of energy is then consumed by the coil.

Additional means for further increasing the speed of the motor is provided similar in construction and operation to that just described. This additional means is controlled by closing switch 32 which closes the circuit of the raising coil 26 of core 24 and switch 22. The circuit of coil 26 is similar to that of coil 27, current passing from main switch 6 through the contacts 47' and switch 47" to the resistance 51 and contact 53', through the insulated bridging piece carried by switch arm 52', contact 54', through coil 26 and switch 32 to the other side of the line. The action in deënergizing coil 26 and energizing holding coil 28 by the movement of core 24 is similar to that described with reference to the operation of switch 23. The opening of switch 22 inserts resistance 49" in the field circuit and by thus weakening the field the speed of the motor is increased. Resistance 49" may again be short circuited by the opening of push button switch 34, and the action is the same as described with reference to the opening of switch 35. It will be seen that resistance 51 is connected in series with, or serves as the choking resistance, for both coils 26 and 27, but separate resistances for each coil may be used if desired. Similarly, resistance 57 serves as the choking resistance for both of the holding coils 28 and 29 but separate resistances may be used. Also resistances 51 and 57 may be placed in series or form a single resistance with a tap at an intermediate point leading to the coils 26 and 27. It will therefore be seen that the connection of the resistances may be variously arranged.

The resistances 49' and 49" are conveniently adjusted to any desired amount by means of the buttons or hand wheels 40 shown in Fig. 1, and which are upon the face of the controlling panel. Ordinarily the initial adjustment of these resistances will serve for all purposes and will only be adjusted upon change of conditions or a different requirement as to change of speed. The adjustment of these resistances will preferably be such that there will be considerable difference in amount, and so secure three different speeds by the operation of switches 22 and 23; for example, if switch 22 be opened and resistance 49" which is in circuit be smaller than the amount of resistance 49' which is in circuit when switch 22 is open, then the smallest increase in speed will be secured. With switch 22 closed and switch 23 open, the next higher speed will be secured and with both switches open the highest speed will be secured.

In order to stop the motor it is merely necessary to open push button switch 31 which will deënergize holding coil 8 of the main switch and so release the main switch 6 which will open the main circuit and the circuits of all the controlling coils which may happen to be closed. The apparatus will then assume the condition shown in Fig. 2.

One important feature of my invention which has been described relates to means for so inter-relating the speed controlling means with the starting means that the field cannot be weakened until all of the starting resistance is cut out of circuit. It will be seen that the closing of the circuits of the raising coils 26, 27 depends upon the switch 47″ being in engagement with contacts 47′. If push button switch 32 or 33 be closed before switch 47″ is closed, the circuits of coils 26 or 27 will not be closed and switch 22 or switch 23 cannot be opened. Consequently, until all of the armature starting resistance 15 has been cut out and the switch 47″ closed by the movement of the plunger 16, no increase in speed by weakening the field can be obtained. I therefore avoid the great strains and possible overheating of the motor which might result otherwise by a careless operator weakening the field strength before the motor had been fully started. It will also be seen that the circuits of the holding coils 28 and 29 are dependent upon the closing of switch 47″. As already explained, the raising coils 26 and 27 cannot serve to open switches 22 and 23 until the switch 47″ is closed, but in case either of the switches 22 or 23 have been opened after the closing of switch 47″, and if from any cause the plunger 16 should fall, even though the main switch 6 has not been opened, the falling of the plunger 16 would then cause the opening of switch 47″ and deënergize coils 28 and 29 and so cause the field resistance 49′, 49″ to be short circuited and strengthen the motor field. The motor therefore in this form of my invention cannot be operated under a weakened field at any time when any of the starting resistance is in series with the motor armature.

In some cases it may be desirable to provide further means for adjusting the resistance in the field circuit manually, and this also should be so related to the controlling means that the field may be weakened only when the starting resistance is out of circuit. For this purpose I have provided the hand-wheel 39 on the controlling panel of Fig. 1, and this is connected to the movable element 50 which adjusts the amount of resistance 49 in the field circuit as already referred to. The element 50 is provided with an outwardly extending arm 50′ adapted to move in the path of the pivoted lever 58. The latter carries a short circuiting switch 58′ and a spring 59 tends to draw this switch into engagement with the contacts 59′ and so short circuit any of the resistance 49 which may be included in the field circuit. A retaining magnet 60 is connected across the main circuit in series with the resistance 57, switch 47″, main switch 6 and overload coil 12. This retaining magnet is adapted to hold one end of the lever 58 against the action of spring 59 and so hold the switch 58′ out of engagement with the contacts 59′. In case it is ever desired to insert resistance 49 or any part thereof in series with the motor field winding, the element 50 must first be returned to its initial position and in so doing the extension 50′ will engage lever 58, disengage switch 58′ and bring one end of the lever within the influence of the magnet 60. If there be no starting resistance in the armature circuit and the switch 47″ is consequently closed, then the magnet 60 will be excited and retain the lever 58 against the attraction of spring 59. The element 50 may then be moved by the operator and any desired amount of resistance 49 may be inserted in the field circuit since the short circuiting switch 58′ is open. In case the operator attempts to insert any of the resistance 49 in circuit before all of the starting resistance has been removed from the armature circuit, the magnet 60 will not then be excited and cannot hold the short circuiting switch 58′ open, and as soon as the operator endeavors to insert resistance 49, the switch 58′ will close automatically and short circuit the rheostat. Also in case the motor is stopped when any of the resistance 49 is in circuit, the magnet 60 will be deënergized and release switch 58′ which will then short circuit the resistance 49. When again starting the motor, the operator must move the element 50 to its initial position and open short circuiting switch 58′, as above explained before any of the resistance 49 can be placed in circuit. Also in case the motor is running with any of the resistance 49 in circuit and the plunger 16 of the starting resistance should fall and so open switch 47″, the retaining magnet 60 will be immediately deënergized and the switch 58′ will then short circuit the field resistance. From the foregoing it will be understood that none of the resistance 49 can be in circuit when the motor is being started, nor can any of the resistance 49 be in circuit when any of the armature starting resistance is in circuit.

I have referred to the starting, stopping and speed controlling push buttons 30, 31, 32, 33, 34 and 35 which are mounted upon the controlling handle of Fig. 1. It may, however, be desirable to provide distant or additional controlling points at a distance for controlling the motor at a more convenient location. In Fig. 2, I have accordingly shown an additional starting push button 30′ in parallel with the push button 30 and also an additional push button 31′ for stopping the motor in series with push button 31. Similarly I have shown additional speed controlling push buttons 32′ and 33′ in parallel respectively with push buttons 32 and 33, and I have also shown additional push button switches 34′ and 35′ in series respectively with the push buttons 34 and 35. These additional push buttons may of course be located at any point or points desired and serve as means for distant control of the motor.

I have already referred to the dash pot 13

17' being of novel construction, and the construction of the same is shown in Fig. 3. In using dash-pots in connection with motor controlling devices, it is important that its action should be uniform when used under varying conditions. One of the objections to the use of dash-pots has been that in warm weather the oil is thin and freely passes through the plunger and to some extent between the plunger and the casing, which results in a comparatively rapid upward movement of the plunger. When the temperature of the dash-pot is appreciably lower as may occur in colder weather, the oil becomes viscous and passes with comparative difficulty through or around the plunger. This results in a very slow upward movement of the plunger and sometimes may even stop in its upward movement. This very slow action in removing the starting resistance from the armature circuit is of course objectionable and may sometimes seriously damage the motor. The overcoming of this difficulty is one of the features of my invention.

Referring to Fig. 3, the cylindrical outside casing of the dashpot is shown at 61, and this contains a closely fitting lining provided with openings 62 in its upper portion. Within the lining is fitted a piston or plunger 63 provided with a large central opening and having slots or grooves 63' in the cylindrical outer face which engages the casing. To a cross bar in the piston is secured the rod 64 which is connected at its upper end to the movable element 19 of the starting resistance. The sleeves 64' keep the lower end of rod 64 in a central position. Over the top of the piston is a cover plate 65 which seats loosely thereon, and at one edge of the cover plate is a screw 65' which passes through the plate and engages the upper surface of the piston at one point. 65'' is a cross pin in the rod 64 which limits the upward movement of the cover plate 65. The top of the casing is covered by any suitable form of cover, but the form shown is particularly well adapted to be easily removed after unscrewing the screw 64'' which engages an undercut portion of the cover.

In operation, when the plunger of the dashpot is drawn upwardly by the core 16, the movement will be a comparatively slow one because the oil passes with difficulty through the slight opening between the cover plate 65 and the top of the piston. The speed of this movement may be adjusted to any desired amount by adjustment of this opening by means of the screw 65'. The grooves 63' in the outer circumference of the piston assist in securing a uniform action, because all parts of the outer surface of the piston will be well oiled and a uniform distribution of the oil is maintained with this form of piston by reason of having a series of surfaces of comparatively short depth and the intermediate oil reservoirs formed by the grooves. When the piston is near the end of its upward travel, its movement will suddenly become very rapid, because the oil can pass freely around the outside of the piston through the slots 62. This rapid movement results in the delivery of a blow to pin 48 of Fig. 2 and quickly opens the circuit of the raising coil 17 as already explained. When the plunger falls by reason of the deënergization of holding coil 18, the cover plate 65 of the piston will rise against the cross pin 65'' allowing the oil to pass freely through the piston and give a rapid fall of the plunger.

The casing and lining of the dash pot is preferably made of brass, and the piston 63 is preferably made of zinc, or of a material having a higher coefficient of expansion than that of the casing. By reason of the use of such materials, the relative expansion and contraction of the casing and piston will be such that with any change of temperature and resulting change of viscosity of the oil, the rate of movement of the piston will be substantially the same for all temperatures. For example, suppose the parts are arranged to operate properly in a room having normal room temperature, then if the device is used in a location where the temperature is much lower, the oil will become more viscous but the piston will contract with the decrease in temperature to a much greater amount than the casing. There will therefore be more play between the piston and casing, and the more viscous oil may then pass easily between the piston and casing. I have found by experiments that with a low expansion casing and a high expansion piston, the relative contraction and expansion of the parts are such that an approximately uniform movement of the piston is the same for all temperatures within the range of ordinary practice.

In some instances I use a casing of porcelain or equivalent non-metallic material of very low dilatation and a piston of suitable material of very high dilatation, thus being able to use fluids whose viscosity changes greatly with changes of temperature.

The form of my invention disclosed in Fig. 4 contains many elements which correspond to the elements already described in connection with Figs. 1 and 2, and operate in substantially the same manner. These elements are similarly numbered in Fig. 4 and in general include the main switch 6, the overload device, the interrelated automatic starting resistance, the field controlling switches 22 and 23, the manually adjusted field resistance 49 and the various push buttons and controlling devices already referred to. Attention however, is called to the fact that in Fig. 4 the holding coils 8 and 18 of the starting switch and starting resistance element are connected in series with each other instead of in parallel as in Fig. 2. Also the resistances 57 and 51 are shown connected in series with each other in Fig. 4, instead of being in separate circuits as in Fig. 2. Also the starting, stopping and speed controlling push buttons are shown differently located in Fig. 4 from the location in Fig. 2, one set of these push buttons being located near the devices controlled by each and an additional set being shown grouped together at the right of the figure. In Fig. 4 however, I have illustrated additional means for controlling the speed of the motor after the starting resistance has been removed from the armature circuit, and this additional speed controlling means is secured by changing regulating resistances in the motor armature circuit. This change in armature resistance for obtaining speed control of the motor is obtained by means of push button control, and I prefer to inter-relate the field controlling means with the armature resistance controlling means in such manner that regulation of speed by change of the field strength can be obtained only after all resistance has been removed from the motor armature circuit. If the armature circuit of the motor be traced in Fig. 4, it will be seen that there is included in this circuit a regulating resistance 66, and a similar resistance 66', which are adapted to be short circuited when switches 67 and 67' are in their upper position. These switches are adapted to fall by gravity to their open position and are raised to their closed position by raising coils 68, 68' which act upon the cores connected to the respective switches. After being raised, the switches are held in their closed position by the holding coils 69, 69'. When the push button switch 70 is closed after the starting resistance 15 has been removed from circuit, the raising coil 68 will be excited, the path of the current being from one side of the circuit through the overload coil 12, main switch 6, switch 47'' which has been closed by the movement of core 16, then through the contacts 71 which are bridged by an insulated connecting piece carried by the pivoted arm 72, then through raising coil 68, switch 70, and resistance 51 to the other side of the line. Switch 67 will therefore be closed and in its upward movement, the core will strike the pin above it with a blow and throw arm 72 into engagement with contact 73 and also cause the contacts 74 to be bridged by an insulated connecting piece carried by the arm 72. The raising coil 68 will therefore be deënergized by interruption of the circuit at contacts 71, but the holding coil 69 will be energized by reason of the switch arm 72 engaging contact 73. The circuit of the holding coil will then be from the main switch 6, through switch arm 72, holding coil 69, push button switch 75 and a similar additional switch 75', through resistances 57 and 51 to the other side of the line. Short circuiting switch 67 will therefore be held closed and the armature resistance 66 will be removed from the armature circuit giving an increased speed of the motor. If it be desired to afterward decrease the speed by inserting the resistance 66 in the armature circuit, the circuit of the holding coil 69 may be interrupted at the push button switch 75, or similar switch 75'. Instead of closing switch 70 for securing the short circuiting of resistance 66, the push button switch 70' may be closed if the latter is more convenient for the operator.

The short circuiting switch 67' is operated and controlled by devices similar to those described with reference to switch 67, the closing of push button switch 76 or 76' serving to close the circuit of the raising coil 68' for short circuiting resistance 66' and so increase the speed of the motor. Switch 67' is opened and then resistance 66' inserted in the armature circuit by the opening of either push button switch 77 or 77'.

It will be seen that the switches 67 and 67' can be closed only after the armature starting resistance is removed from circuit, since the completion of the circuits of raising coils 68, 68' is dependent upon the closing of switch 47''; also the circuits of the holding coils 69, 69' is dependent upon switch 47''. This arrangement insures the removal of the starting resistance from the armature circuit before the regulating resistances 66 and 66' can be short circuited, and it also insures that these resistances cannot be short circuited at any time when any starting resistance is in circuit. It will also be seen that the raising coils 68 and 68' are deënergized through the upward movement of their cores and therefore carry only momentary current; also the holding coils 69 and 69' carry current only when the resistances 66 and 66' are short circuited. I prefer to adjust the resistances 66 and 66' to different amounts, and thereby secure three different speeds of the motor by manipulation of the switches 67 and 67'. For example, if resistance 66 is smaller than resistance 66', one increase in speed will be obtained by closing switch 67, a higher speed will be obtained by opening switch 67 and closing switch 67', and a still higher speed will be obtained by the closure of both of these switches.

The field controlling means shown in Fig. 4, as already stated, is similar to that of Fig. 2, but the construction is such in Fig. 4 that the field strength may not be weakened by opening switches 22 and 23, or by adjusting the resistance 49 until not only the starting resistance 15 has been removed from the armature circuit, but the regulating resistances 66 and 66' as well. I accomplish this by making the completion of the circuits of the raising and holding coils of switches 22 and 23 dependent upon the short circuiting or removal of all motor armature resistance, and also by making the circuit of the retaining magnet 60 similarly dependent upon the removal of all armature resistance. It will be seen that the circuit to these coils and retaining magnet 60 includes the overload coil 12, main switch 6, switch 47'', contacts 74 and the bridging connection, and contacts 74' and bridging connection. The switch 47'' is closed only when the starting resistance is removed from circuit, the connection between contacts 74 is closed only when the resistance 66 is short circuited and the connection between the contacts 74' is closed only when the resistance 66' is short circuited. Consequently, the magnetic field of the motor cannot be weakened until after all armature resistance is removed from circuit, nor can any resistance be inserted in the motor armature circuit without the motor field being at its full strength because the falling of core 16, or switch 67, or switch 67', will interrupt the circuit of the holding coils 28 and 29 and magnet 60, so that any resistance in the field circuit which may happen to be inserted will be immediately short circuited.

In the form of my invention shown in Fig. 5, the motor controlled is assumed to be so designed that the starting resistance in the armature circuit is not necessary. The controlling means for the starting resistance shown in Figs. 2 and 4 is therefore omitted in Fig. 5. I have also omitted the manual means for adjusting the field strength of the motor, and the field strength is governed entirely by automatically controlled switches. In this figure, I have illustrated an additional regulating resistance 66'' in the motor armature circuit controlled by the switch 67'', and this switch and controlling means are similar to the switches 67 and 67' and their controlling means, the parts being correspondingly numbered. The push button switch for causing the closing of the short circuiting switch 67'' is shown at 78, and the switch for causing the opening of switch 67'' is shown at 79. The corresponding additional push button switches are shown at 78' and 79'. In this figure, instead of only two switches 22 and 23 for controlling the field circuit, I have shown an additional switch 23' which controls the resistance 49''' in the field circuit, and is controlled in the same manner as switches 22 and 23, and therefore need not be particularly described, the parts being correspondingly numbered. A push button switch for controlling the opening of switch 23' and thus weakening the motor field strength is shown at 80, and the switch for controlling the closing of switch 23' is shown at 81. Corresponding additional push button switches are shown at 80' and 81'. It will be seen that all of the regulating resistance in the armature circuit must be short circuited before the motor field strength can be weakened for increasing the speed by the opening of switches 22, 23 and 23'. This is accomplished by making it necessary to close all three switches 74, 74' and 74'' before the circuits of the coils controlling the field switches can be completed. The regulating resistances in the armature circuit will preferably each differ in amount from the others so that by closing the different switches 67, 67' and 67'' separately and in various combinations, a large number of different speeds may be secured by operation of these three switches. Similarly the three field resistances 49', 49'' and 49''' will preferably differ from each other so that by separately closing switches 22, 23 and 23', and by closing them in different combinations a large number of different speeds will be obtained. It will be seen that the armature resistance controlling switches 67, 67' and 67'' cannot be closed until after the main switch 6 is closed, not only because the circuits of the raising coils 68, 68' and 68'' will naturally be open at the push button switches, but even if they are closed, sufficient current cannot pass through the circuits of these raising coils for closing their respective switches until the main switch 6 is closed.

In the form of my invention shown in Fig. 6, the operation and control of the motor is entirely automatic and independent of any operator. The motor armature 37 is shown as operating a rotary pump 82 which supplies the reservoir 83. A float 84 in the reservoir is connected to a lever 85, and the position of the lever will be determined by the level of the liquid in the reservoir. In the position shown, the liquid has attained its maximum level and the motor has stopped operating. When the level of the liquid falls, the motor will be started through the medium of the float and lever 85, and the greater the fall in the level of the liquid, the greater will become the speed of the motor, and correspondingly, as the level approaches the maximum the speed of the motor will become gradually less until it is stopped at the highest level. There is therefore very great range in speed control of the motor, and in the rate at which the liquid is supplied to the reservoir which arrangement is very desirable under certain conditions. A controlling panel is indicated in Fig. 6 by the rectangle 86, and which is assumed to contain the controlling devices described with reference to Fig. 4 with the exception of the manually operated element 50 and resistance 49. The various devices are not illustrated within this rectangle for simplicity in the figure and because they have already been explained. The constant electromotive force source 1 is shown connected to the terminals 2, 3 of the panel and the connections to the motor are shown connected to the terminals 36 of the panel. Extending from the controlling devices of the panel are a series of small sized wires which extend to the push buttons 31, 30, 75, 70, 77, 76, 34, 32, 35 and 33, the connections being the same as with the same push buttons shown in Fig. 4.

The push buttons are arranged in the arc of a circle in the order named and are adapted to be successively engaged and operated by the lever 85. In the position shown in Fig. 6, the push button 31 is engaged by arm 85, and this push button is therefore open. Consequently in this position the holding coil 8 is open circuited, and the main switch 6 is therefore open, and no current passes to the motor or to any of the controlling devices. When the level of the liquid falls, the lever 85 will pass off the button 31, and allow this push button switch to be closed. The lever will then engage and close push button 30 which will cause the motor to be started and the starting armature resistance to be cut out. Arm 85 will then pass over push button switch 75 and open the same which will have no effect. The arm will then engage and close push button switch 70 which will increase the speed of the motor by the closure of switch 67 and so short circuit the regulating resistance 66. Similarly, switch 77 will next be opened by the arm without effect and then switch 76 will be closed which cuts out the final armature regulating resistance 66' by the closure of switch 67'. In the same way push button switch 34 will be opened and passed over without effect and then switch 32 will be closed which will cause the weakening of the motor field and further increase in speed by the insertion of resistance 49'' in the field circuit. Push button switch 35 will then be operated without effect, and finally push button switch 33 will be closed which will bring the motor to full speed by further weakening the field.

When the level of the liquid thereafter begins to rise, the arm 85 will first engage push button switch 35 which will open the circuit of the holding coil 29 and cause switch 23 to be closed and so decrease the speed of the motor. The arm will then pass over and close switch 32 without effect as the circuit of raising coil 26 is then open at contacts 53', 54'. Switch 34 will then be engaged and opened by the arm which will open the circuit of holding coil 28 and cause a further decrease in speed of the motor by the closure of switch 22 and consequent strengthening of the motor field. Switch 76 will then be passed over and closed without effect and then switch 77 will be opened and cause a further decrease in the motor by the insertion of resistance 66' in the motor armature circuit. The arm 85 will then engage and close switch 70 without effect and then open the switch 75 causing a further decrease in the motor speed by the insertion of resistance 66 in the motor armature circuit. Switch 30 will then be passed over and closed without effect and finally at the maximum level, push button switch 31 will be opened by the arm 83 which will cause the motor to stop by the opening of the main switch 6. It will be understood that if the level of the liquid varies so that the arm 85 passes over only a portion of these push buttons and then returns to the stopping position, or if the change in level causes a to-and-fro movement of the arm over various intermediate push buttons, the speed of the motor will be correspondingly controlled, depending upon the number of push buttons engaged and the control will be similar to that already described, although all of the push buttons and controlling devices may not be brought into service.

It will be understood that in this form of automatic control, fewer push buttons and controlling devices may be used if desired and the regulation of the speed may be entirely by field control, as in Fig. 2 or may be entirely by armature resistance control. Also the form of control described in connection with Fig. 5 may be used as well as various other modifications. Also instead of having the control dependent upon a water level as in Fig. 6, the control may be dependent upon air pressure or pressure of other gases, or may be dependent upon the movement of a device mechanically moved by the motor to be controlled as in planing machines, hoists, rolling mills, etc.

Although I have described various features of my invention and various modifications, it will be understood that some features of my invention may be omitted, and they may be combined differently than in the forms I have illustrated, and also used in conjunction with other improvements. Also various modifications may be made without departing from the spirit of my invention.

Having thus described my invention, I declare that what I claim as new and desire to secure by Letters Patent, is,—

1. An electric motor having a field winding energized independently of its armature current, electro-magnetic means for controlling the variation of current in said field winding, said means comprising a plurality of independently movable resistance controlling members, and two controlling devices for controlling said means to cause increase and decrease of current in said field winding respectively.

2. An electric motor having a field winding energized independently of its armature current, a plurality of steps of resistance in series with said field winding, electro-magnetic switches for controlling each of said resistances respectively, and means for selectively controlling said switches.

3. A motor having a field winding energized independently of its armature current, an automatic switch adapted to establish both the armature and the field circuit of the motor, means for controlling the current in the armature circuit, an electro-magnetic device for controlling the current in said field winding separately from said armature controlling means, and two contact devices for controlling said electro-magnetic device to cause increase and decrease of current in said field winding respectively.

4. A dynamo electric machine having a field winding energized independently of its armature current, a plurality of steps of resistance in series with said field winding, a plurality of coöperating electro-magnetic switches controlling said resistances respectively, and means for selectively controlling said switches.

5. The combination of an electric motor having a field winding energized independently of its armature current, a main switch and a resistance controlling contact device in series with each other and with the motor armature, said device having a movable element adapted to successively control a plurality of contacts, said switch and device each having two electroresponsive windings for controlling their movement, one of said windings in each case being for moving the movable element and the other of said windings being for holding said element.

6. The combination with an electric motor of automatic controlling means comprising a switch, a raising coil for the movable element of said switch, a holding coil for the said element, and connections for causing said raising coil to be short-circuited by the closure of said switch.

7. The combination of an electric motor, an automatic starting rheostat and an automatic switch in series with each other and with the motor armature, the said switch having a closing coil and a holding coil, and connections for causing said closing coil to deënergize itself in closing said switch.

8. The combination of a field winding, two automatic circuit controlling devices therefor each having a movable element, a suction coil for each element for moving it to a certain position, a holding coil for each element for holding the same in a certain position, at least one of said suction coils being in series with the translating device.

9. The combination of a motor having a field winding energized independently of its armature current, a resistance controlling device for said motor having a movable element, a coil for causing said element to move to reduce the resistance when said coil is energized, means for reducing the energy of said coil when said element has been automatically moved to a certain position, a holding coil for holding said element after it has been moved to said position, a switch in series with said element, and means for automatically closing said switch, said automatically closing means comprising a magnetic coil and means for reducing the current therein, said last named means being dependent upon the closing movement of said switch.

10. The combination of constant electromotive force supply mains, an electric motor, a rheostat having magnetic means for automatically moving the movable element of said rheostat, a switch having magnetic means for automatically closing said switch, an overload protective coil, the said rheostat, switch, overload coil and armature of the motor all being connected in series in a branch circuit across said mains, the said motor having a field winding connected in a shunt circuit around the motor armature and said rheostat, the said rheostat having an actuating coil also connected in a shunt circuit around the motor armature and said rheostat, both of said shunt circuits being controlled by said switch, said switch having a coil for automatically closing said switch when the coil is energized, means for causing the watts of the actuating coil of said rheostat and the closing coil of said switch to be automatically reduced after said coils have performed their respective functions, and means for causing said switch and the movable element of said rheostat to be moved to their initial positions upon the occurrence of no-voltage.

11. The combination of constant electromotive force supply mains, an electric motor, a rheostat having magnetic means for automatically moving the movable element of said rheostat, a switch having magnetic means for automatically closing said switch, an overload protective coil, the said rheostat, switch, overload coil and armature of the motor all being connected in series in a branch circuit across said mains, the said motor having a field winding connected in a shunt circuit around the motor armature and said rheostat, the said rheostat having an actuating coil also connected in a shunt circuit around the motor armature and said rheostat, both of said shunt circuits being controlled by said switch, said switch having a coil for automatically closing said switch when the coil is energized, means for causing the watts of the actuating coil of said rheostat and the closing coil of said switch to be automatically reduced after said coils have performed their respective functions, and means for causing said switch and the movable element of said rheostat to be moved to their initial positions upon the occurrence of no-voltage and also upon occurrence of overload current through the motor armature.

12. The combination of a circuit controlling device having a movable element, an electro-responsive device incapable of moving said element but adapted to hold the same in a certain position after being moved thereto, a winding for automatically moving said element to said certain position, a plurality of functionally related automatically movable electrically controlled circuit controlling elements, the movement of said latter elements being mechanically independent of the movement of the first element, and a translating device having circuits controlled by said first element and said second named elements respectively, said controlled circuits being connected in parallel with each other.

13. The combination of a circuit controlling device having a movable element, an electro-responsive device incapable of moving said element but adapted to hold the same in a certain position after being moved thereto, a winding for automatically moving said element to said certain position, and means for automatically short-circuiting the latter winding.

14. The combination of a circuit controlling device having a movable element, an electro-responsive device incapable of moving said element but adapted to hold the same in a certain position after being moved thereto, a winding for automatically moving said element to said certain position, means for automatically shunting said winding when in said certain position, and means for causing the automatic movement of said element to its initial position upon overload.

15. The combination of an electric motor, a rheostat in the motor armature circuit, said rheostat having no open circuit position, electroresponsive means for automatically cutting out the resistance of said rheostat, additional electroresponsive means for maintaining said rheostat in the all resistance out position, a switch in series with the motor armature and said rheostat, a coil for automatically closing said switch, and means for reducing the watts of said coil when said switch is closed.

16. The combination of a supply circuit, a circuit controlling device having a movable element, a magnetic coil for moving said element, means for reducing the energy of said coil automatically after said element is moved, and without opening the circuit of said coil, and a magnetic coil for holding said element in its final position, said latter coil being adapted to release said element upon no-voltage.

17. The combination of an electric motor, an armature starting rheostat, magnetic means for operating said rheostat, electric means controlled by the operator for contolling the magnetic means, a field controlling resistance, magnetic means for automatically controlling said resistance, and electric means controlled by the operator for controlling said latter means for automatically inserting and cutting out said field resistance.

18. The combination of an electric motor, a plurality of field controlling resistance steps, means for starting the motor, electrically controlled means for selectively inserting and cutting out said resistance steps at the will of the operator, and means for rendering the control of said field resistance steps effective only after the motor has been started.

19. The combination of an electric motor, an armature starting resistance, armature regulating resistance for speed control of the motor, electric means for automatically controlling said regulating resistance, and means rendering the control of said regulating resistance effective only after the starting resistance has been cut out.

20. The combination of an electric motor, remote control means for the armature circuit of the motor, remote control means for the field circuit of the motor comprising a plurality of independently controllable steps of resistance, and means for protectively functionally relating said two control means.

21. The combination of an electric motor, an armature starting resistance, automatic means for controlling the cutting out of said resistance, a field circuit speed controlling resistance, automatic means for controlling said field resistance, and means for rendering the control of said armature resistance ineffective except when the field resistance is in a certain condition.

22. The combination of an electric motor, an armature resistance, a field resistance, automatic controlling apparatus comprising a plurality of controlling circuits for automatically controlling said resistances, and a plurality of functionally related remote control means therefor respectively.

23. The combination of an electric motor, an armature controlling element, means comprising a manually operated switch for automatically controlling the movement of said element, a field controlling element, means comprising a second manually operated switch for automatically controlling the movement of said field element, and means for insuring automatic control of one of said elements only when the other of said elements is in a certain condition.

24. The combination of an electric motor, an armature controlling element, automatic means for controlling said element, a field controlling element, automatic means for controlling said field element, means for protectively functionally relating the operation of said elements, and a plurality of manually controlled magnetically moved means for controlling the automatic movement of each of said elements.

25. The combination of an electric motor, a field controlling resistance, a switch for controlling said resistance, an actuating coil for moving said switch, a holding coil for said switch, and means for causing the actuating coil to be automatically deënergized after movement of said switch.

In testimony whereof I affix my signature, in presence of two witnesses.

HARRY WARD LEONARD.

Witnesses:
LEONARD KEBLER,
CAROLYN G. LEONARD.

---

Copies of this patent may be obtained for five cents each, by addressing the "Commissioner of Patents, Washington, D. C."